May 15, 1923.
W. H. CORNWELL
SELF ADJUSTING HEADLIGHT
Filed Nov. 7, 1921
1,455,600
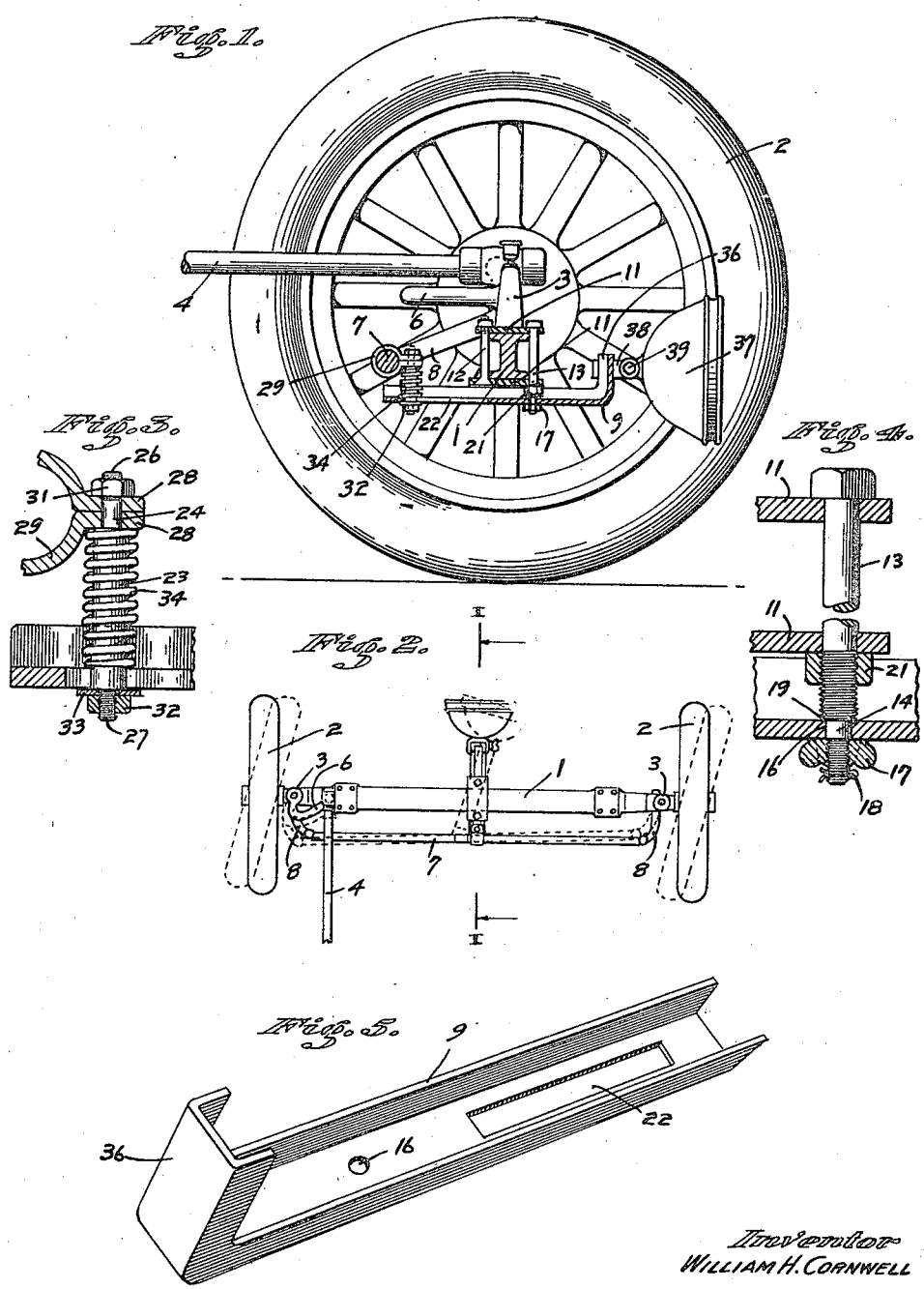

Patented May 15, 1923.

1,455,600

UNITED STATES PATENT OFFICE.

WILLIAM H. CORNWELL, OF OAKLAND, CALIFORNIA.

SELF-ADJUSTING HEADLIGHT.

Application filed November 7, 1921. Serial No. 513,494.

*To all whom it may concern:*

Be it known that I, WILLIAM H. CORNWELL, a citizen of the United States, and a resident of Oakland, county of Alameda, and State of California, have invented a new and useful Self-Adjusting Headlight, of which the following is a specification.

The present invention relates to improvements in self adjusting headlights for motor vehicles or the like and has particular reference to the mounting of a headlight in such a manner that the latter will automatically assume a position in line with the direction of the vehicle. A further object of the invention is to mount a headlight in such manner that vibrations of the same are reduced to a minimum. A further object is to provide a simple and economical means for mounting the said headlight so that any person not skilled in that particular art may easily install the mounting means on any motor vehicle. A further object is to provide mounting means which are adjustable to a large number of different makes of vehicles.

With these objects in view I have illustrated the preferred form of my invention in the accompanying drawing, in which Figure 1 represents a longitudinal cross section through my device along line 1—1 of Figure 2; Figure 2 a top plan view of my device as attached to the front axle and the steering rod of a motor vehicle; Figure 3 an enlarged detail view illustrating the manner of fastening my device to the steering rod, Figure 4 is a similar enlarged detail view illustrating the manner of securing my device to the front axle, and Figure 5 a perspective detail view of a channel used as a headlight supporting member.

The front axle (1) of a motor vehicle using my device is shown as supported on the front wheels (2), the steering knuckles (3) allowing the wheels to be turned relative to the axle by means of the steering rod (4) actuating the arm (6) engaging one of the wheels (2), the turning movement being transmitted to the other wheel by means of the connecting rod (7) engaging the two corresponding arms (8) in a well known manner. Nothing new is claimed with reference to the parts thus far described the only essential point being that a connecting rod (7) is provided in spaced relation to the front axle and is actuated either to the right or to the left whenever the direction of the vehicle is changed.

Preferably underneath the front axle is supported the channel (9) shown in detail in perspective view in Figure 5. The channel toes upward and is secured to the front axle by means of two plates (11) positioned one on top and one underneath the front axle and joined by two bolts (12) and (13). The bolt (13), as shown in detail in Figure 4, is provided with a reduced extension (14) adapted to fit into a corresponding perforation (16) of the web of the channel and is held in that position by a wing nut (17), a cotter pin (18) preventing an unloosening of the latter nut. In this manner the web of the channel is firmly held between the shoulder (19) formed between the bolt (13) and the reduced portion (14) and the wing nut (17). The bolt itself is secured against vertical motion by the nut (21). By this arrangement the channel is allowed to pivot in a horizontal plane.

The rear end of the channel is provided with a slot (22) adapted to receive a sleeve (23) supported on a rod (24) threaded at either end as shown at (26) and (27). The upper end of the rod extends through corresponding perforations in the two lips (28) of a clamp (29) which latter fits firmly on the connecting rod (7). Both ends of the rod (24) are provided with nuts (31) and (32), a washer (33) being introduced at the lower end. By means of these two nuts the two lips (28) of the clamping member, the sleeve (23) and the channel (9) can be brought into firm engagement with each other, a spring (34) wound around the sleeve holding the channel in spaced relation to the clamp (29).

The front end of the channel (9) is bent upwardly as shown at (36) and is designed to support the headlight (37) in any manner desired, preferably by means of a sleeve (38) fitting around the channel, a pivot (39) allowing of vertical adjustment of the headlight relative to its support.

In operation it will be seen that when the driver turns his vehicle to the right as indicated in dotted lines in Figure 2, the connecting rod (7) will be moved to the left and will transmit its motion through the clamp (29) to the channel (9), which latter will be caused to pivot on the bolt (13)

whereby the headlight will be turned to the right, that is, into the direction of the travel of the motor vehicle.

At the same time the introduction of the spring member (34) prevents the transmission of vibrations from the connecting rod to the channel so that the headlight will be in no manner affected by the latter vibrations.

It will be understood that slight changes or modifications of the device illustrated in the drawings may be made without departing from the spirit of the present invention and without leaving the scope of the claims hereto attached.

I claim:

1. For a vehicle having a front axle and a steering rod supported in spaced relation thereto, a headlight mounting comprising an upwardly toeing channel pivotally supported underneath the axle, a perforation in the rear arm of the same, a clamping member on the steering rod, a vertically yielding connection between the rear arm and the clamping member, and means for supporting the headlight on the front end of the channel.

2. For a vehicle having a front axle and a steering rod supported in spaced relation thereto, a headlight mounting comprising an upwardly toeing channel, means for pivotally securing the same to the front axle comprising a bolt supported in the front axle, a perforation in the channel, a reduced extension of the bolt adapted to be received in said perforation and means for securing the channel in its place, means for securing the rear arm of the channel to the steering rod and means for supporting the headlight on the front arm.

3. For a vehicle having a front axle and a steering rod supported in spaced relation thereto, a headlight mounting comprising an upwardly toeing channel, means for pivotally securing the same to the front axle comprising a bolt supported in the front axle, a perforation in the channel, a reduced extension of the bolt adapted to be received in said perforation and means for securing the channel in its place, vertically yielding means for securing one arm of the lever to the steering rod and means for securing the light on the other arm.

4. For a vehicle having a front axle and a steering rod supported in spaced relation thereto, a headlight mounting comprising an upwardly toeing channel pivotally secured to the front axle, a clamp secured on the steering rod, a bolt supported in the clamp, a slot in the channel adapted to receive the bolt, spring means for spacing the channel relative to the rod, and a nut for holding the channel on the sleeve.

WILLIAM H. CORNWELL.